United States Patent [19]
Kristensen et al.

[11] Patent Number: 4,787,207
[45] Date of Patent: Nov. 29, 1988

[54] MULTI-ENGINE PLANT INCLUDING TURBOCHARGED COMBUSTION ENGINES

[75] Inventors: Hans C. Kristensen, Holeby; Hans C. Lauritsen, Nysted, both of Denmark

[73] Assignee: M.A.N.-B & W Diesel A/S, Hvidovre, Denmark

[21] Appl. No.: 922,339

[22] Filed: Oct. 23, 1986

[30] Foreign Application Priority Data

Oct. 28, 1985 [DK] Denmark ............................ 4938/85

[51] Int. Cl.$^4$ ............................................. F02D 25/00
[52] U.S. Cl. ........................................ 60/710; 60/716
[58] Field of Search ................. 60/607, 612, 698, 710, 60/714, 716

[56] References Cited

U.S. PATENT DOCUMENTS 1,880,674 10/1932 Bauer ..................................... 60/714
2,998,698 9/1961 Rieseler ................................. 60/607

*Primary Examiner*—Stephen F. Husar
*Attorney, Agent, or Firm*—Bacon & Thomas

[57] ABSTRACT

The multi-engine consists in one embodiment of a relatively large turbocharged ship's diesel engine and three smaller turbocharged auxiliary or stand-by diesel engines. The main engine is primarily adapted for propelling the ship while the auxiliary engines solely drive electric generators. In view of the rigorous demands on the security of the delivery of electricity it is desirable to operate one or more of the auxiliary engines in stand-by mode during a substantial part of the operation time of the plant, i.e. unloaded or at low load. This involves problems for the engine concerned because the charging air pressure generated by the associated turbocharger is then lower than the exhaust gas pressure. As the turbocharger of the main engine produces a large amount of charging air at normal operation, the charging air system of said engine is connected in parallel with the charging air systems of the auxiliary engines through a conduit, whereby surplus charging air from the main engine is utilized to raise the charging air pressure in the auxiliary engine(s) running in stand-by mode.

6 Claims, 4 Drawing Sheets

MULTI-ENGINE PLANT INCLUDING TURBOCHARGED COMBUSTION ENGINES

BACKGROUND OF THE INVENTION

This invention relates to a multi-engine plant comprising a plurality of turbocharged internal combustion engines, of which at least one is intended to operate in stand-by mode during a substantial part of the plant's operating time while simultaneously another engine operates on load, each of said engines having an individual charging air system.

In this context an engine operating in stand-by mode means an engine that idles for extended periods of time, i.e. runs unloaded, or at low load, for instance not exceeding about 25% of the maximum output.

Said mode of operation—which one would generally seek to avoid—occurs in connection with self-contained power plants, i.e. plants independent of external energy sources, requiring a high degree of security of continuous energy delivery. Such power plants are typically used on board ships, drilling platforms and in connection with other units isolated with a view of energy.

In order to make sure that the actual needs for energy delivery can be met at any working conditions, it is necessary, and generally obligatory, to provide the plant with a number of additional or auxiliary engines, which on occasion, and possibly then at rather short notice, shall be able to contribute to, and possibly fully take over the delivery of energy.

Due to the fact that the power plants in question are often automatic, and thus periodically unmanned, the energy delivery criterion implies that the auxiliary engines shall run continuously, meaning that they mainly operate in stand-by mode.

As mentioned above this mode of operation is undesirable because it involves various problems of which the most severe are: Low temperature corrosion and contamination of air and gas passages by blowback of exhaust gas. Concurrent with decreasing load the last mentioned problem becomes more and more predominant until the exhaust gas pressure finally exceeds the charging air pressure, following which the insufficient charging air pressure incontestably is the main cause of the above mentioned problems resulting from stand-by operation.

Under these circumstances it is necessary to increase the charging air pressure and it is known to do so by means of an electrically driven auxiliary blower. Due to various reasons said solution is, however, not optimum. It necessitates the presence of and investment in comparatively expensive blowers etc. and from the energy aspect it does not constitute an optimum solution for the plant as a whole.

SUMMARY OF THE INVENTION

The multi-engine plant according to the invention differs from prior plants in that there is provided a conduit which connects the charging air system of the stand-by engine with the charging air system of the on-load engine at a location downstream of the compressor outlet of said latter system, and means for opening and closing said conduit.

In this context the charging air system of an engine includes the entire system of flow passages connected to the compressor part of the turbocharger, upstream as well as downstream thereof.

By connecting the charging air system of an on-load engine, which in this context means an engine working at from about 50% to 100% of its maximum load, to the charging air system of the stand-by engine, the desired increase of the charging air pressure of the last mentioned engine is obtained in a simple manner. This is possible because within said working range the on-load engine's turbocharger generates a considerable amount of surplus energy in the form of pressurized charging air. As regards the power plant as a whole an improvement of the total efficiency has thus been obtained beyond what is possible with respect to the individual engine.

In view of the fact that for a power plant in a ship the fuel costs amount to about 40% of the total operating expenses of the ship, it will be understood that even minor improvements in the efficiency entail considerable savings.

Advantageously, the conduit terminates in at least one nozzle aperture in the compressor housing of a turbo-charger associated with the stand-by engine. The supplementary charging air may, however, in principle, be supplied to the charging air system of the stand-by engine anywhere in that system.

Similarly, the conduit may in principle be connected to the charging air system of the on-load engine anywhere in the system. Preferably, however, an air cooler is provided in the system, and the conduit is then branched off upstream of the air cooler. The surplus air is thus withdrawn at high pressure and high temperature.

The means for opening and closing the conduit may be an automatic stop valve adapted to be controlled in dependence on the instantaneous working condition of the stand-by engine.

BRIEF DESCRIPTION OF THE DRAWINGS

The invention will now be described in more detail with reference to the accompanying drawings, in which.

DETAILED DESCRIPTION

Figure 1:
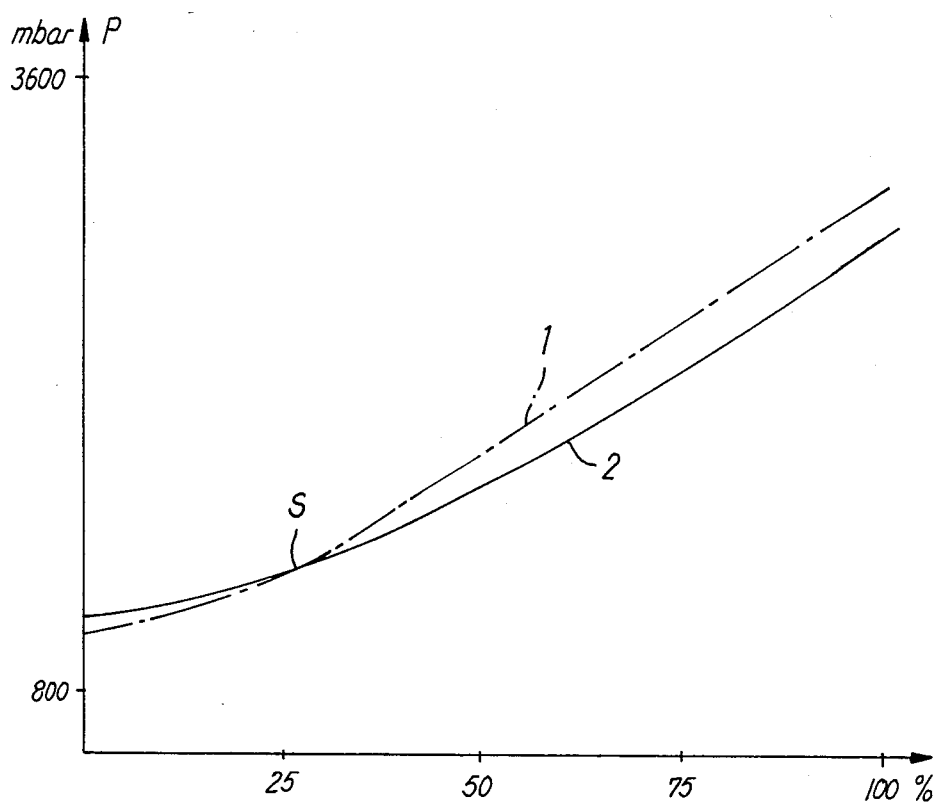
FIG. 1 is a graph illustrating the relation between the charging air pressure and the exhaust gas pressure in a turbocharged diesel engine.

The graph in FIG. 1 illustrates the general relation between the exhaust gas pressure and the charging air pressure in a turbocharged diesel engine at varying load. The dash-and-dot curve 1 represents the charging air pressure and the full-line curve 2 represents the exhaust gas pressure. The abscissa axis shows the percentage loading of the engine and the ordinate axis shows the absolute pressure values in millibar. As shown, the two curves intersect in point S at a loading percentage of about 25. At loading percentages above that, the charging air pressure of the engine is higher than the exhaust gas pressure while the reverse is the case at loading percentages below about 25, i.e. in the typical stand-by range. When the inlet and outlet periods of an engine cylinder overlap, exhaust gases will consequently flow back into the charging air system, thereby involving the previously mentioned problems and making in practice continuous stand-by operation impossible within that load range.

In this mode of operation it is therefore necessary to increase the charging air pressure so as to exceed the exhaust gas pressure. According to the invention this is advantageously effected by supplying a surplus of charging air from the charging air system of an on-load engine to the charging air system of a stand-by engine.

Said supplementary amount of charging air may principally be fed anywhere into the charging air system of the stand-by engine, for instance through injection ports or nozzles in the compressor housing, in the transitional passage to a charging air cooler or in the charging air receiver.

Figure 3:
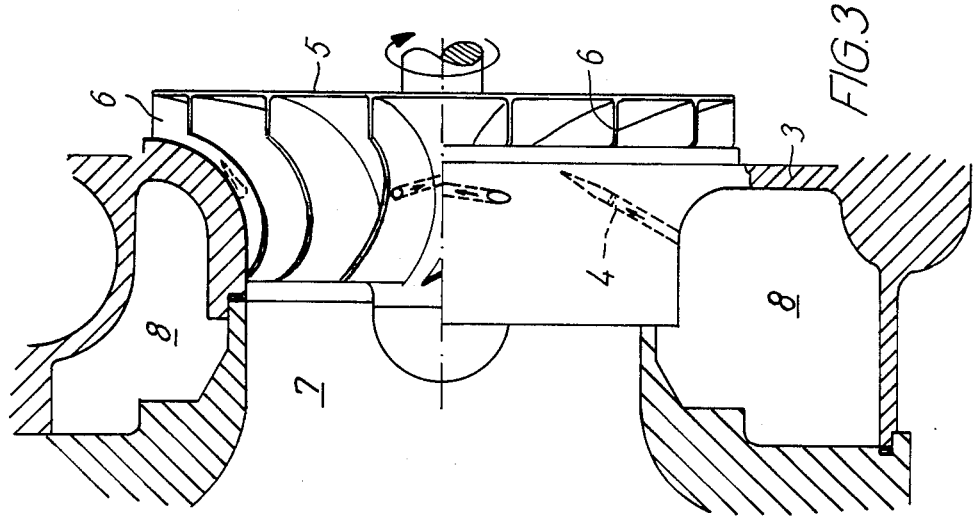
FIG. 3 is a sectional view through the compressor part of the turbocharger shown in FIG. 2.
Figure 2:
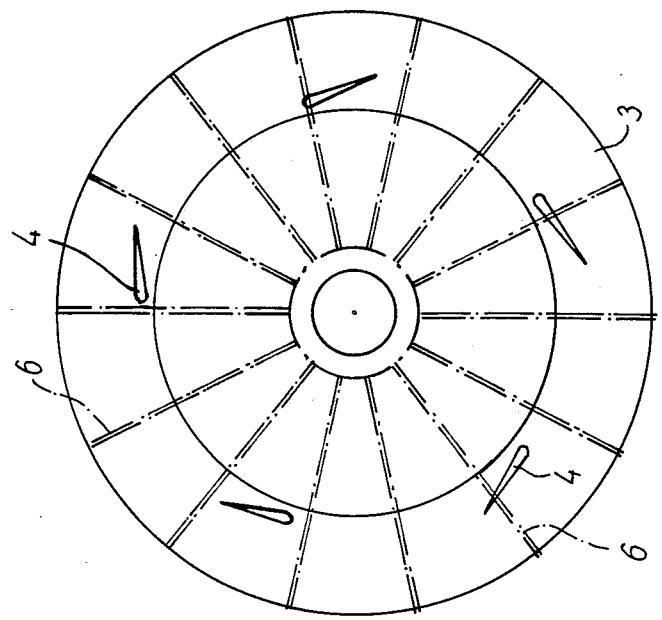
FIG. 2 is a schematical end view of the compressor housing of a turbocharger.

FIGS. 2 and 3 schematically illustrate how such injection ports may be carried out in practice. Five injection ports 4 are uniformly distributed along the circumference of a compressor housing 3. The ports are oriented substantially tangentially towards the blades 6 of the compressor wheel 5 and in their direction of rotation, so that the supplied air impinges tangentially onto the blades, thereby contributing to the rotation of the compressor wheel. The normal supply of air to the turbocharger is effected through the port 7 while the supplementary supply of air to ports 4 in housing 3 is effected through an annular chamber 8 provided therein.

Figure 4:
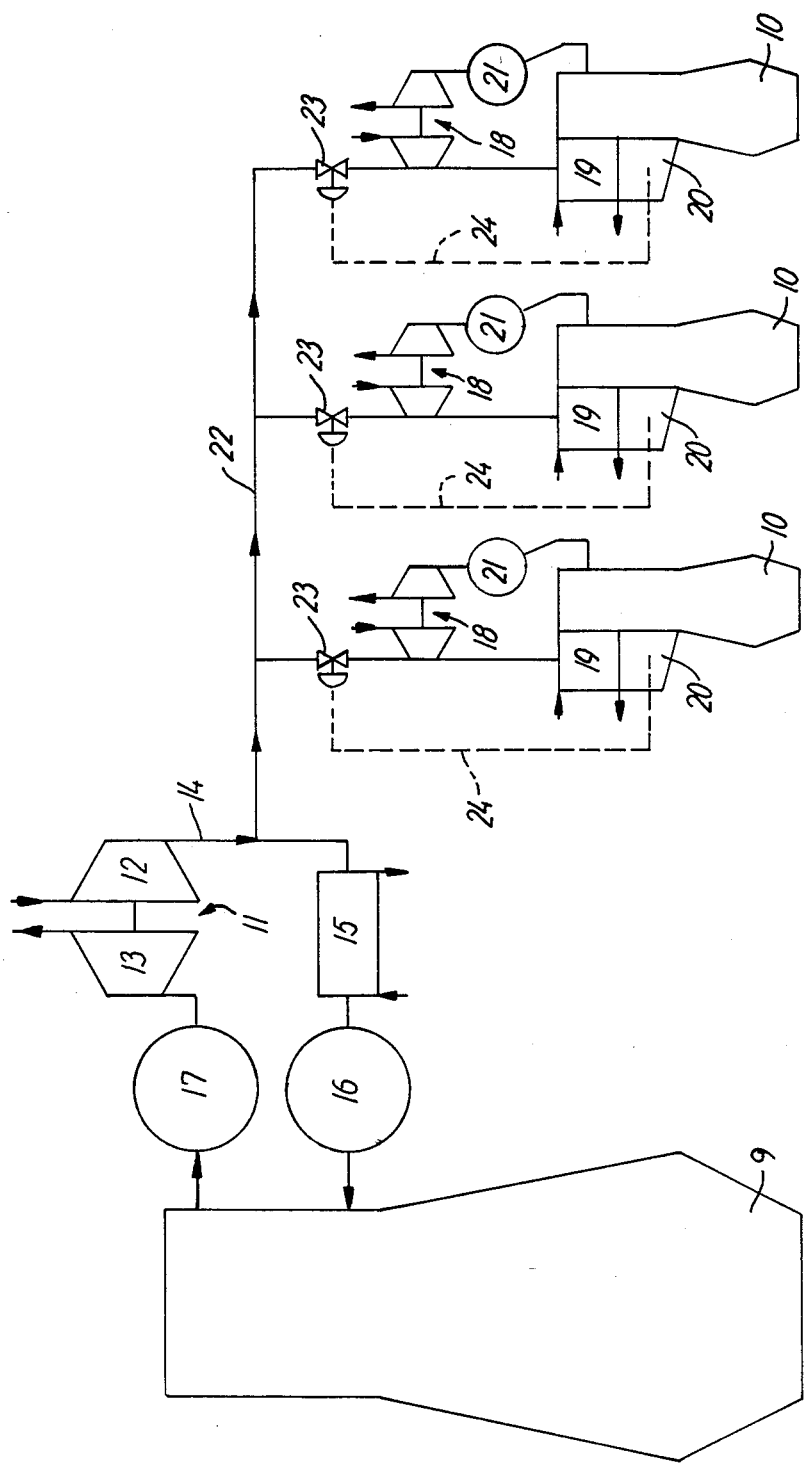
FIG. 4 illustrates a first example of a multi-engine plant according to the invention.

FIG. 4 illustrates a diagram of a multi-engine plant to be used in a ship. The plant includes a comparatively large turbocharged main engine 9 for propelling the ship and three minor, likewise turbocharged auxiliary engines 10 each driving an individual electro-generator, not shown. Main engine 9 includes a turbocharger 11 with a compressor part 12 and a turbine part 13. The compressed charging air is delivered from compressor part 12 through a duct 14 to an air cooler 15 and from there through a charging air receiver 16 to the individual cylinders of engine 9.

Turbocharger 11 is driven by the exhaust gases generated by the combustion and supplied through an exhaust receiver 17 to the turbine part 13 of turbocharger 11.

Each of the three auxiliary engines 10 includes analogously a turbocharger 18, a charging air cooler 19, a charging air receiver 20 and an exhaust receiver 21.

Through a conduit 22 extending from duct 14 between compressor part 12 and charging air cooler 15 the charging air system of main engine 9 is connected in parallel with the charging air systems of the three auxiliary engines 10. As illustrated, the connection of duct 22 to each of the individual charging air systems is located in the compressor housing of the respective turbocharger 18. A stop valve 23 is provided between the charging air system of each auxiliary engine and the charging air system of the main engine. Each valve 23 is controlled, as illustrated by dotted signal lines 24, by the pressure in the respective charging air receiver 20.

During normal operation of the ship the main engine 9 is primarily used for propelling the ship. Secondarily, the main engine may drive one or more electrogenerators, not shown, either directly coupled to the crankshaft of engine 9 or through steam turbines utilizing waste heat from engine 9. As the production of electricity by the main engine is the most economical it is desired to utilize it maximally so that only seldom all of the auxiliary engines will be on-load. Accordingly, one or more of them will operates in stand-by mode. Said working mode will be detected by sensors accommodated in the individual charging air receivers, whereupon the sensors will cause the associated valve or valves 23 to open and allow air under considerably higher pressure to be supplied from the charging air system of the main engine to the charging air system of said auxiliary engine or engines through conduit 22. The charging air pressure in the auxiliary engine is thus raised to a value above the exhaust gas pressure, thereby eliminating the problems involved by stand-by operation.

In case the load on the electrical grid should exceed the maximum power which can be delivered by the main engine driven generators, e.g. if it is desired to increase the propulsion power—which will take place at the expense of the directly coupled generator power of the main engine—or if the other reasons, such as manoeuvring or the like, the main engine is not capable of meeting the need for electricity it is necessary to render one or more, depending on the need, of the auxiliary engines operative. As the auxiliary engines are already in the stand-by mode they may be "switched on" so rapidly that any immediate need for electricity may always be met, independent of the main engine.

Figure 5:
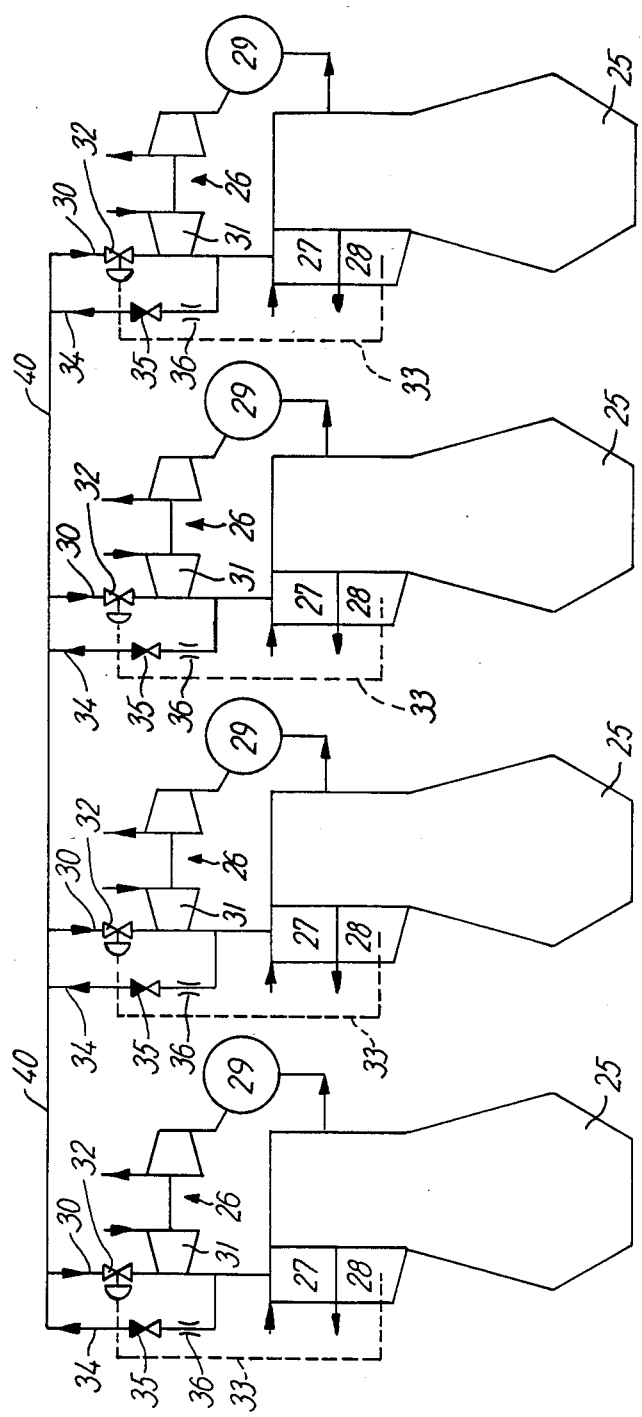
FIG. 5 is a second example of a multi-engine plant according to the invention.

FIG. 5 shows a diagram of a multi-engine plant including a plurality of identical turbocharged diesel engines to be used for instance in supply-ships or in connection with oil drilling.

In addition to carrying out common transportation jobs that only require a minor portion of the maximum output available, supply ships shall also assist in anchoring of offshore platforms and in other critical tasks requiring that supplementary power is immediately available, thereby necessitating continuous stand-by running of one or more of the installed engines.

Since oil drilling may require quite large outputs it may, under certain critical working conditions be required that additional power is available for prompt assistance. Said requirement will most economically be met with one or more engines running in standing mode.

The plant illustrated in FIG. 5 includes four engines 25 each comprising a turbocharger 26, a charging air cooler 27, a charging air receiver 28 and an exhaust receiver 29.

The charging air systems of all engines 25 are connected in parallel through conduits 30 extending between nozzle apertures in the compressor housings 31 of the respective turbochargers 26 and a common manifold 40. As described with reference to FIG. 4 stop valves, here designated by 32, are provided at the respective inlets to the compressor housings. Said valves prevent overloading of the individual engines and ensure that no air escapes through an engine which has been stopped. They are controlled, as illustrated by dotted signal lines 33, by pressure sensors accommodated in associated charging air receivers 28 so that any valve opens when the charging air pressure is lower than the exhaust gas pressure, and closes when the loading of the engine attains a specific critical limit or when the engine is stopped.

A discharge conduit 34 extends from the downstream side of the compressor part of each turbocharger to the manifold 40. A one-way valve 35 which prevents gas flow in the direction towards the compression side of the turbocharger is provided in each discharge conduit 34 in series with a throttle valve 36.

In case the associated turbocharger 26 produces surplus charging air, conduit 34 serves to feed said air to manifold 40 and throttle valve 36 serves to ensure that the amount of air withdrawn from the turbocharger is not larger than permissible for safe operation of the associated engine.

In order to utilize the surplus charging air to the maximum extent, this air is withdrawn from the transitional passage between compressor housing 31 and charging air cooler 27, where the pressure and temperature of the air attain maximum values.

If another engine of the plant runs in stand-by mode and its turbocharger thus requires supplementary charging air, the associated closing valve 32 will be open and the surplus charging air flows directly from manifold 40 to the charging air system of said stand-by engine.

As the plant comprises mainly identical engines the actual "grouping" of the engines with respect to on-load and stand-by engines is immaterial, since the coupling of the charging air systems of all engines ensures that available surplus charging air from any "on-load engines" is at all times distributed to any air-deficient "stand-by engines".

What is claimed:

1. A multi-engine plant comprising a plurality of turbocharged internal combustion engines (9, 10), of which at least one (10) is intended to operate in stand-by mode during a substantial part of the plant's operating time while simultaneously another engine (9) operates on load, each of said engines (9, 10) having an individual turbocharger (11,18), the compressor part of which is connected with the associated engine via a charging air system wherein a conduit (22) is provided which connects the charging air system of the stand-by engine (10) with the charging air system of the on-load engine (9) at a location downstream of the compressor outlet of said latter system, and means for opening and closing said conduit (22).

2. An engine plant as claimed in claim 1, wherein the conduit (22) terminates in at least one nozzle aperture in the compressor housing of a turbocharger (18) associated with the stand-by engine (10).

3. An engine plant as claimed in claim 2, wherein an air cooler (15) is provided in the charging air system of the on-load engine (9) and the conduit (22) is branched off from the charging air system of the on-load engine (9) upstream of said air cooler (15).

4. An engine plant as claimed in claim 1, wherein the means for opening and closing the conduit (22) is an automatic stop valve (23) adapted to be controlled in dependence on the instantaneous working condition of the stand-by engine (10).

5. An engine plant as claimed in claim 1, comprising a relatively large main diesel engine (9) for the propulsion of a ship and a plurality of smaller auxiliary diesel engines (10), and in which the charging air system of each engine comprises a charging air receiver (16; 20) for distributing the air to the individual engine cylinders, wherein the charging air system of each auxiliary engine (10) communicates with the charging air system of the main engine (9) through a conduit (22), an automatic stop valve (23) is provided in each of said conduits upstream of the connection of that conduit (22) to the charging air system of the auxiliary engine (10), and control means are provided for opening and closing each stop valve 923) in dependence on the pressure in the associated charging air receiver (20).

6. An engine plant as claimed in claim 1, comprising a plurality of diesel engines (25) of by and large identical power outputs, and wherein the charging air system of each engine comprises a charging air receiver (28) for distributing the air to the individual engine cylinders, wherein there are provided conduits (30, 40) which connect the charging air system of all engines (25) in parallel, an automatic stop valve (32) is provided upstream of the connection between the charging air system of each engine and said conduits (30), control means are provided for opening and closing each stop valve (32) in dependence on the pressure in the associated charging air receiver (28), and a discharge conduit (34) connects the downstream side of each compressor (31) with the upstream side of the associated stop valve (32) and includes a throttle valve (36) in series with a one-way valve (35) preventing gas flow towards the downstream side of the compressor.

* * * * *